(12) United States Patent
Huang

(10) Patent No.: US 10,708,181 B2
(45) Date of Patent: Jul. 7, 2020

(54) ESTABLISH A SOURCE ROUTING TREE FOR GATEWAY NODE IN A MESH NETWORK

(71) Applicant: Hewlett Packard Enterprise Development LP, Houston, TX (US)

(72) Inventor: Kangchang Huang, Beijing (CN)

(73) Assignee: Hewlet Packard Enterprise Development LP, Houston, TX (US)

( * ) Notice: Subject to any disclaimer, the term of this patent is extended or adjusted under 35 U.S.C. 154(b) by 6 days.

(21) Appl. No.: 16/006,337

(22) Filed: Jun. 12, 2018

(65) Prior Publication Data

US 2019/0327170 A1    Oct. 24, 2019

(30) Foreign Application Priority Data

Apr. 20, 2018 (CN) .......................... 2018 1 0359806

(51) Int. Cl.
| | |
|---|---|
| *H04W 56/00* | (2009.01) |
| *H04L 12/753* | (2013.01) |
| *H04L 12/721* | (2013.01) |
| *H04L 12/66* | (2006.01) |

(52) U.S. Cl.
CPC .............. *H04L 45/48* (2013.01); *H04L 12/66* (2013.01); *H04L 45/32* (2013.01); *H04L 45/66* (2013.01)

(58) Field of Classification Search
CPC ......... H04L 45/48; H04L 12/66; H04L 45/32; H04L 45/66
USPC ....................................................... 370/390
See application file for complete search history.

(56) References Cited

U.S. PATENT DOCUMENTS

| | | | |
|---|---|---|---|
| 6,917,985 B2 | 7/2005 | Madruga et al. | |
| 7,606,187 B2 | 10/2009 | Zeng et al. | |
| 8,223,660 B2 | 7/2012 | Allan et al. | |
| 8,650,285 B1 | 2/2014 | Sajassi et al. | |
| 9,602,399 B2 | 3/2017 | Jetcheva et al. | |
| 10,069,639 B2* | 9/2018 | Bragg | H04L 12/18 |
| 2010/0027541 A1* | 2/2010 | Eriksson | H04W 72/005 |
| | | | 370/390 |
| 2015/0244617 A1* | 8/2015 | Nakil | G06F 9/45558 |
| | | | 709/224 |
| 2015/0257179 A1* | 9/2015 | Kim | H04L 41/0803 |
| | | | 370/328 |

OTHER PUBLICATIONS

Hamraz, H. et al., Wireless Mesh Networks a Survey on Routing Approaches, (Research Paper), 2011, 22 pages.

* cited by examiner

*Primary Examiner* — Sai Ming Chan
(74) *Attorney, Agent, or Firm* — Jaffery Watson Mendonsa & Hamilton

(57) ABSTRACT

An example device at a gateway node in a mesh network comprising: a processor to negotiate with other gateway node in the mesh network to obtain a common network identifier wherein the mesh network includes at least two gateway nodes uniquely identified by at least two node identifiers; report the common network identifier to a route generator for establishing a source routing tree for gateway nodes in the mesh network, wherein the source routing tree includes the gateway node as a root and a plurality of non-root nodes each comprising a non-gateway node including the device.

18 Claims, 6 Drawing Sheets

ESTABLISH A SOURCE ROUTING TREE FOR GATEWAY NODE IN A MESH NETWORK

BACKGROUND

The Data Link Layer is the second layer in the Open System Interconnect (OSI) Reference Model, so it is called layer 2. A large number of network devices in layer 2 may be automatically form a mesh network. The mesh network may include at least one gateway node and at least one non-gateway node. The gateway node therein generally refer to inter-network connectors and/or protocol converters that are adapted to allow devices in one network to communicate with devices in another network via various communication standards. In the mesh network, a frame may be flooded to all nodes in the mesh network in some cases. Since there may have some loop paths and multiple gateway nodes in a mesh network, the mesh network may need to handle duplicated frames.

DETAILED DESCRIPTION

Figure 1:
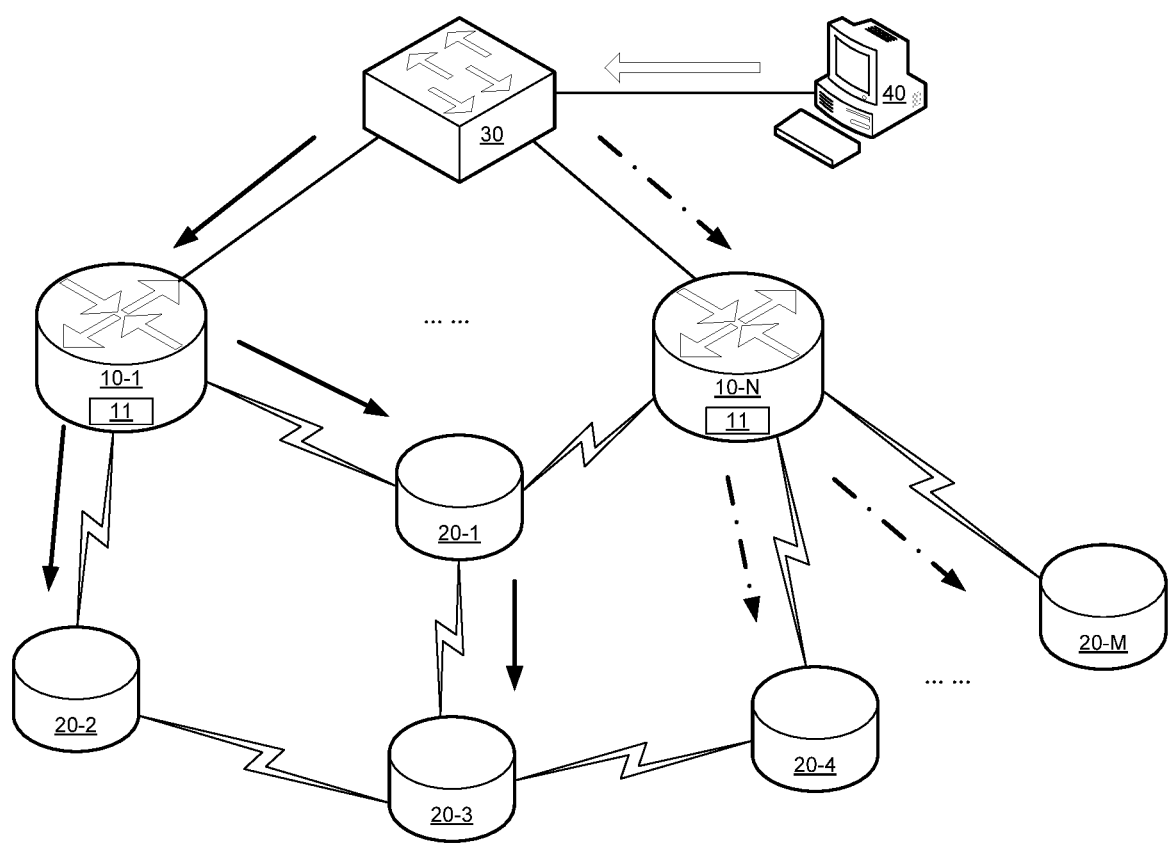
FIG. 1 is a block diagram illustrating an example mesh network including a device capable of establishing a source routing tree for gateway node in a mesh network according to the present disclosure.

To handle the loop paths and decrease the frame transmissions, one approach is constructing a flooding tree (also referred to as "source routing tree"). The source routing tree refers to a forwarding tree that uses the multicast source as the root node and combines the shortest path from the multicast source to each receiver. The root node of the source routing tree is the multicast source, and other nodes in the source routing tree are leaf nodes. In a mesh network, when the multicast source is a gateway node of the mesh network, the source routing tree may include each node in the mesh network. Then, traffic can be forwarded to nodes in the mesh network by a network device according to the source routing tree.

The source routing tree may be indexed by a unique node identifier (e.g., node-ID) of a source node. The unique node identifier may include a route-ID or a media access control (MAC) address, etc. When a mesh node floods a frame, the frame may be flooded to all nodes in the mesh network according to the sending node's source routing tree. Nodes receiving the flooded frame in the mesh network can choose to send frames to links that are in the source routing tree.

If the mesh network has one gateway node, a frame from external network may be flooded through this gateway node's source routing tree to every node in the mesh network, and each node in the mesh network may accept one frame. But when there are multiple gateway nodes in the mesh network, a frame from external network may be flooded to the mesh network through all gateway nodes' source routing tree and each node in the mesh network may accept multiple copy of the frame.

For example, in a mesh network with two gateway nodes (e.g. gateway node A and gateway node E), each gateway node may maintain a separate source routing tree, and each source routing tree includes both gateway nodes and non-gateway nodes in the mesh network. When a device in an external network sends out a multicast frame, the external switch may flood the frame to both gateway node A and gateway node E. And both gateway nodes may flood the frame to all internal nodes in the mesh network. In the above example, both gateway node A and E have their unique source routing trees. The frame that is flooded to gateway node A may be forwarded to all nodes in the mesh network according to the source routing tree of gateway node A. The frame that is flooded to gateway node E may be forwarded to all nodes in the mesh network according to the source routing tree of gateway node E. Therefore, each node in the mesh network may receive two or more copies of the frame if there are multiple gateway nodes in the mesh network. Since the original frame from the sender is based on the IEEE 802.3 protocol and there is no sequence number to identify the frame itself, all nodes in the mesh network may have to accept all received copies of the frame.

Accordingly, in the examples herein, when a mesh network includes at least two gateway nodes uniquely identified by at least two node identifiers, all gateway nodes in the mesh network may negotiate with each other to obtain a common network identifier (e.g., Network-ID) and report the common network identifier to a route generator for establishing a source routing tree for gateway nodes in the mesh network, wherein the source routing tree includes the gateway node as a root and a plurality of non-root nodes each comprising a non-gateway node including the device. In other words, according to the common network identifier and node identifiers of the gateway nodes, a source routing tree may be established for each gateway node in the mesh network. Each non-gateway node in the mesh network is assigned to one of the gateway nodes. That is to say, the mesh network may be split into multiple source routing trees according to the number of gateway nodes. Then, when a frame was flooded into the mesh network, different gateway nodes may forward the frame to different source routing trees and mesh nodes in those different source routing trees. Each non-gateway node in the mesh network may accept the frames forwarded by the assigned gateway node, but cannot accept frames forwarded by other gateway nodes that belong to a different source routing tree. Since each non-gateway node in the mesh network may accept a single copy of the flooded frame, no duplicated flooding frame is accepted.

In one example, a device at a gateway node in a mesh network may negotiate with other gateway node in the mesh network to obtain a common network identifier wherein the mesh network includes at least two gateway nodes uniquely identified by at least two node identifiers. The device may also report the common network identifier to a route generator for establishing a source routing tree for gateway nodes in the mesh network, wherein the source routing tree includes the gateway node as a root and a plurality of non-root nodes each comprising a non-gateway node including the device.

In another example, a method comprising negotiating, by a processor of a gateway node, with a gateway nodes in the mesh network to obtain a common network identifier wherein the mesh network includes at least two gateway nodes uniquely identified by at least two node identifiers; and reporting, by the processor, the common network identifier to a route generator for establishing a source routing tree for gateway nodes in the mesh network, wherein the source routing tree includes the gateway node as a root and a plurality of non-root nodes each comprising a non-gateway node including the device.

In another example, a non-transitory computer readable storage medium storing instructions that, when executed by a processor of a gateway node, causes the processor to negotiate with other gateway node in the mesh network to obtain a common network identifier wherein the mesh network includes at least two gateway nodes uniquely identified by at least two node identifiers; and to report the common network identifier to a route generator for establishing a source routing tree for gateway nodes in a mesh network, wherein the source routing tree includes the gateway node as a root and a plurality of non-root nodes each comprising a non-gateway node including the device.

As used herein, a "network device" generally includes a device that is adapted to transmit and/or receive signaling and to process information within such signaling such as a station (e.g., any data processing equipment such as a computer, cellular phone, personal digital assistant, tablet devices, etc.), a gateway node, a non-gateway node, data transfer devices (such as network switches, routers, controllers, etc.) or the like. As used herein, a "gateway node" generally refers to Inter-network connector and/or protocol converter for any known or convenient network access technology which may later become known. Specifically, the term gateway node is not intended to be limited to IEEE 802.11-based gateway nodes. Gateways generally function as an electronic device that is adapted to allow devices in one network to communicate with devices in another network via various communications standards.

It is appreciated that examples described herein below may include various components and features. Some of the components and features may be removed and/or modified without departing from a scope of the device, method and non-transitory computer readable storage medium for establishing a source routing tree for gateway node in a mesh network.

It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

As used herein, a component is a combination of hardware and software executing on that hardware to provide a given functionality.

FIG. 1 is a block diagram illustrating an example mesh network including a device capable of establishing a source routing tree for gateway node in a mesh network according to the present disclosure. Referring to FIG. 1, a mesh network may include a plurality of gateway nodes 10-1 to 10-N and a plurality of non-gateway nodes 20-1 to 20-M, where each gateway node is connected to an external switch 30, which may be connected to at least one external device 40 in an external network.

Each gateway node may include a processor 11. When a mesh network includes at least two gateway nodes uniquely identified by at least two node identifiers, the processor 11 of each gateway node may negotiate with other gateway nodes in the mesh network to get a common network identifier.

Then, the common network identifier may be reported to a route generator for establishing a source routing tree for each gateway node in the mesh network based on the common network identifier and node identifiers of the gateway nodes, wherein the source routing tree includes the gateway node as a root and a plurality of non-root nodes each comprising a non-gateway node including the device. So, each non-gateway node in the mesh network is assigned to one of the gateway nodes and accepts the frames forwarded by the assigned gateway node.

For example, as shown in FIG. 1, a mesh network may include N (N≥2) gateway nodes 10-1 to 10-N and M (M≥2) non-gateway nodes 20-1 to 20-M. N gateway nodes may negotiate with each other and obtain a common network identifier. Then, N gateway nodes may report the common network identifier and their respective node identifiers to a route generator used to generate the source route tree. In one example, the route generator may be a centralized generator that generates a source route tree in a centralized manner (e.g., a controller at the network side), or it may be all nodes in a source route tree that generate the source route tree in a distributed manner. The route generator finds that N gateway nodes with different node identifiers have the same network identifier, thus determines that the N gateway nodes belong to the same mesh network. Therefore, N source routing trees may be respectively established by the route generator for the N gateway nodes in the mesh network based on the common network identifiers and N node identifiers, wherein the source routing tree may include the gateway node as a root and a plurality of non-root nodes each comprising a non-gateway node including the device. In one example, the source routing tree may correspond to a source routing tree identifier that is based on a combination of the common network identifier and a node identifier of the gateway node. In one example, non-gateway nodes belonging to the source routing tree may accept a first plurality of frames forwarded by the gateway node corresponding to the source routing tree identifier. In one example, the accepted first plurality of frames may be transmitted to other nodes on non-mesh links. In one example, non-gateway nodes belonging to the source routing tree may transmit a second plurality of frames forwarded by a second and different gateway node corresponding to a second and different source routing tree identifier on mesh links in the mesh network. So, each non-gateway node in the mesh network is assigned to one of the gateway nodes and accepts the frames forwarded by the assigned gateway node.

For example, all non-gateway nodes in the mesh network may be assigned to N gateway nodes according to a round robin schema. In another example, non-gateway nodes in the mesh network may be assigned to N gateway nodes based on the distance between each non-gateway node and gateway nodes. For example, a non-gateway node may be assigned to the gateway node that is closest to the non-gateway node. The distance between non-gateway nodes and gateway nodes may be calculated in a variety of ways. For example, the distance between the non-gateway node and the gateway node may be obtained by calculating the strength of the signal received by the non-gateway node from the gateway node. Therefore, the distance between each non-gateway node and each gateway node may be predetermined. In another example, non-gateway nodes in the mesh network may be assigned to N gateway nodes based on the traffic load of each gateway node. When the assignment is based on the traffic load of each gateway node, all non-gateway nodes may be dynamically assigned to each gateway node. For instance, at one point of time, when a gateway node (e.g., gateway node 10-1) has a low traffic load, multiple non-gateway nodes (e.g., non-gateway node 20-1 to 20-5) may be assigned to the gateway node; and at a future point of time, when the gateway node has a high traffic load, multiple non-gateway nodes may be assigned to other gateway node (e.g., gateway node 10-2).

Further, before negotiating the common network identifier, each gateway node may determine the number of gateway nodes in the mesh network. For example, each node (including gateway nodes and non-gateway nodes) in the mesh network may send a detection frame to devices connected by wire before the gateway nodes negotiate the common network identifier. For instance, as shown in FIG. 1, since the gateway node 10-1 is connected to the external switch 30 by wire, the gateway node 10-1 may send a detection frame to the external switch 30, and the external switch 30 may forward the frame to the gateway node 10-2. Then, the gateway node 10-2 may receive the detection frame from the gateway node 10-1. In the same way, the gateway node 10-2 may send a detection frame, and the gateway node 10-1 may receive the detection frame from the gateway node 10-2. After receiving the detection frame, the gateway node may determine the number of gateway nodes in the mesh network based on the number of received detection frames. For example, if a gateway node receives k detection frames, the gateway node may determine that the mesh network has k+1 gateway nodes.

Further, if a node in the mesh network does not receive any detection frame, the node may report a predefined network identifier (e.g., Network-ID 0), which is different from the common network identifier and specifically used to indicate failure to receive detection frame. Therefore, gateway nodes and non-gateway nodes may be distinguished based on the common network identifier and/or the predefined network identifier reported by each node.

For instance, as shown in FIG. 1, since the node 20-1 is not connected to any device by wire, the node does not send a detection frame, nor does it receive a detection frame. Even if the node 20-1 is connected to a non-gateway device (for example, a peripheral device such as a printer) by wire, the node sends a detection frame to the non-gateway device, but since the non-gateway device does not forward a detection frame to the node 20-1, the node 20-1 may not receive any detection frame. Thus, the node 20-1 may report a predefined network identifier that is different from a common network identifier.

Figure 2:
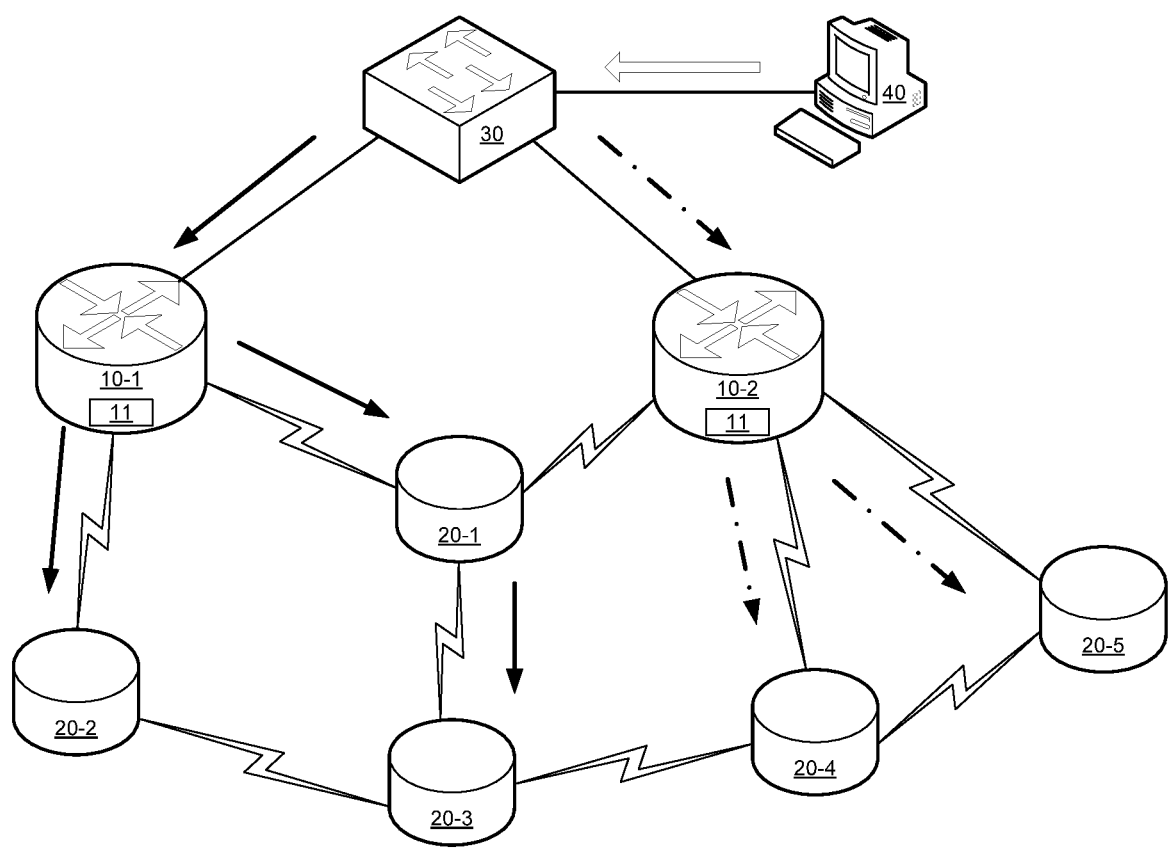
FIG. 2 is a block diagram illustrating an example mesh network including a device capable of establishing a source routing tree for gateway node in a mesh network according to the present disclosure.

FIG. 2 is a block diagram illustrating an example mesh network including a device capable of establishing a source routing tree for gateway node in a mesh network according to the present disclosure. Referring to FIG. 2, a mesh network may include two gateway nodes (i.e. 10-1 and 10-2) uniquely identified by two node identifiers and five non-gateway nodes (i.e. 20-1 to 20-5), where each gateway node is connected to an external switch 30 which may be connected to at least one external device 40 in an external network.

Each gateway node may include a processor 11. Then, two gateway nodes 10-1 and 10-2 may negotiate each other and obtain a common network identifier. Then, the two gateway nodes may report the common network identifier and their respective node identifiers to a route generator for establishing the source route tree. The route generator finds that two gateway nodes with different node identifiers have the same network identifier, thus determines that the two gateway nodes belong to the same mesh network. Therefore, two source routing trees may be respectively established by the route generator for the two gateway nodes in the mesh network based on the common network identifier and two node identifiers of two gateway nodes, wherein each source routing tree includes a gateway node as a root and a plurality of non-root nodes each comprising a non-gateway node including the device. So, each non-gateway node in the mesh network is assigned to one of the gateway nodes and accepts the frames forwarded by the assigned gateway node.

That is to say, a source routing tree indexed by a source routing tree identifier that is based on a combination of the common network identifier and a node identifier of the gateway node 10-1 may be established for the gateway node 10-1 (i.e. as shown by the solid arrow in FIG. 2) and another source routing tree indexed by another source routing tree identifier that is based on a combination of the common network identifier and a node identifier of the gateway node 10-2 may be established for the other gateway node 10-2 (i.e. as shown by the dashed arrows in FIG. 2). Then, the mesh network may be split into two source routing trees according to the two gateway nodes 10-1 and 10-2, and the two source routing trees do not have overlapping nodes.

For another example, all non-gateway nodes in the mesh network may be assigned to two gateway nodes according to a round robin schema, such as, as shown in FIG. 2, the non-gateway nodes 20-1 to 20-3 are assigned to gateway node 10-1, and the non-gateway nodes 20-4 and 20-5 are assigned to gateway node 10-2. So, the non-gateway nodes 20-1 to 20-3 may accept the frames forwarded by the assigned gateway node 10-1, and the non-gateway nodes 20-4 and 20-5 may accept the frames forwarded by the assigned gateway node 10-2.

For another example, all non-gateway nodes in the mesh network may be assigned to two gateway nodes based on the distance between each non-gateway node and two gateway nodes. For example, a non-gateway node may be assigned to the gateway node that is closest to the non-gateway node. The distance between non-gateway nodes and two gateway nodes may be calculated in a variety of ways. For example, the distance between the non-gateway node and the two gateway nodes may be obtained by calculating the strength of the signal received by the non-gateway node from the two gateway nodes. Therefore, the distance between each non-gateway node and two gateway nodes can be predetermined.

For another example, all non-gateway nodes in the mesh network may be assigned to two gateway nodes based on the traffic load of two gateway nodes.

When the assignment is based on the traffic load of each gateway node, all non-gateway nodes may be dynamically assigned to two gateway nodes. For instance, at one point of time, when the gateway node 10-1 has a low traffic load, the non-gateway nodes 20-1 to 20-5 may be assigned to gateway node 10-1; and at a future point of time, when the gateway node 10-1 has a high traffic load, the non-gateway nodes 20-1 to 20-5 may be assigned to gateway node 10-2.

Figure 3:
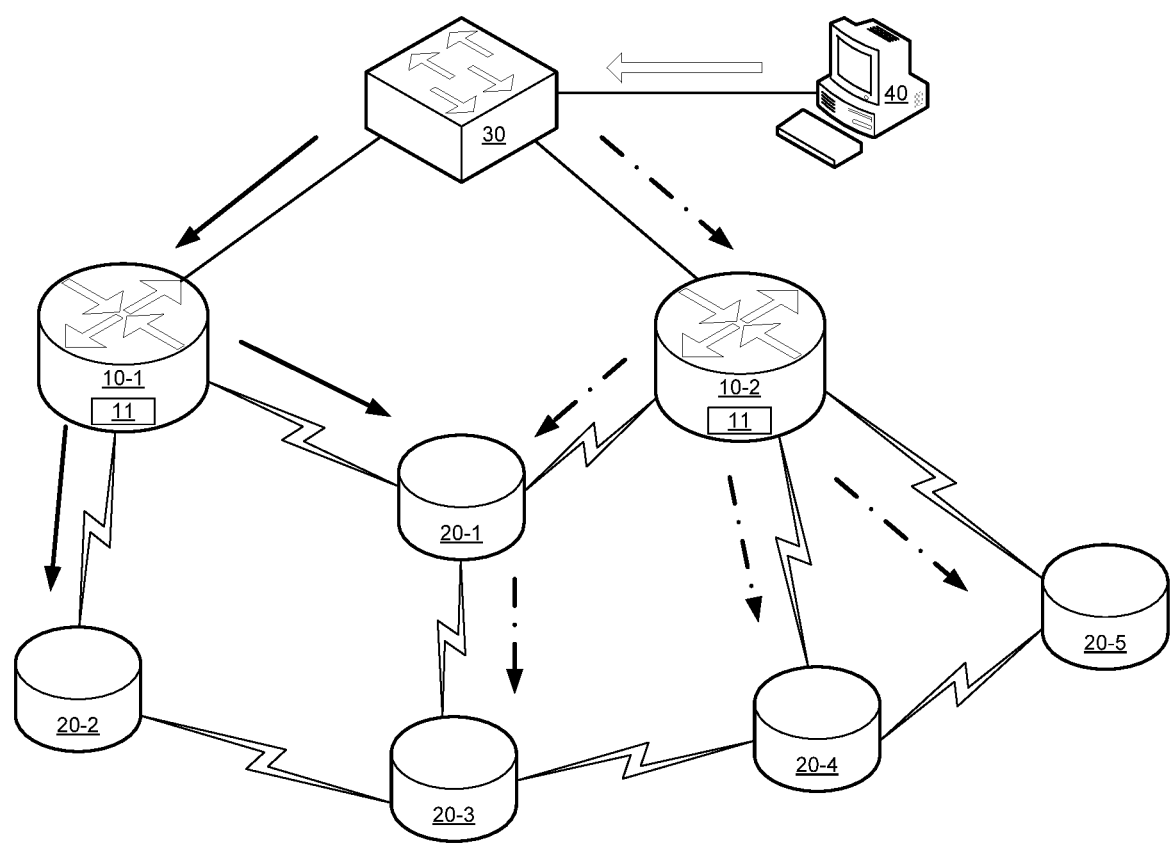
FIG. 3 is a block diagram illustrating an example mesh network including a device capable of establishing a source routing tree for gateway node in a mesh network according to the present disclosure.

FIG. 3 is a block diagram illustrating an example mesh network including a device capable of establishing a source routing tree for gateway node in a mesh network according to the present disclosure. Referring to FIG. 3, a mesh network may include two gateway nodes (i.e. 10-1 and 10-2) uniquely identified by two node identifiers and five non-gateway nodes (i.e. 20-1 to 20-5), where each gateway node is connected to an external switch 30 which may be connected to at least one external device 40 in an external network.

Each gateway node may include a processor 11. Then, two gateway nodes 10-1 and 10-2 may negotiate each other and obtain a common network identifier. Then, the two gateway nodes may report the common network identifier and their respective node identifiers to a route generator for establishing the source route tree. The route generator finds that two gateway nodes with different node identifiers have the same network identifier, thus determines that the two gateway nodes belong to the same mesh network. Therefore, two source routing trees may be respectively established for the two gateway nodes in the mesh network based on the common network identifier and two node identifiers of two gateway nodes, wherein each source routing tree includes a gateway node as a root and a plurality of non-root nodes each comprising a non-gateway node including the device. So, each non-gateway node in the mesh network is assigned to one of the gateway nodes and accepts the frames forwarded by the assigned gateway node.

That is to say, a source routing tree indexed by a source routing tree identifier that is based on a combination of the common network identifier and a node identifier of the gateway node 10-1 may be established for the gateway node 10-1 (i.e. as shown by the solid arrow in FIG. 3) and another source routing tree indexed by another source routing tree identifier that is based on a combination of the common network identifier and a node identifier of the gateway node 10-2 may be established for the other gateway node 10-2 (i.e. as shown by the dashed arrow in FIG. 3). Then, the mesh network may be split into two source routing trees according to the two gateway nodes 10-1 and 10-2, and the two source routing trees may have at least one overlapping node. In this example, the two source routing trees may have a common non-gateway node 20-1.

However, since each non-gateway node in the mesh network is assigned to one of the gateway nodes, each non-gateway node in the mesh network accepts the frames forwarded by the assigned gateway node and discard or forwards the frames forwarded by other gateway nodes.

For example, all non-gateway nodes in the mesh network may be assigned to two gateway nodes according to a round robin schema, such as, as shown in FIG. 3, the non-gateway nodes 20-1 and 20-2 are assigned to gateway node 10-1, and the non-gateway nodes 20-3 to 20-5 are assigned to gateway node 10-2. So, the non-gateway nodes 20-1 and 20-2 may accept the frames forwarded by the assigned gateway node 10-1, and the non-gateway nodes 20-3 to 20-5 may accept the frames forwarded by the assigned gateway node 10-2.

For another example, assume that the non-gateway node 20-1 is located in the path of two source routing trees, and the non-gateway node 20-1 is assigned to the gateway node 10-1. Then, when receiving a frame forwarded by the gateway node 10-1, the non-gateway node 20-1 accepts the received frame; Further, the accepted frame may be transmitted to other nodes on non-mesh link by the non-gateway node 20-1; when receiving a frame forwarded by the gateway node 10-2, the non-gateway node 20-1 forwards the received frame to the non-gateway node 20-3 but does not accept the received frame. That is to say, the non-gateway node 20-1 may accept the frames forwarded by the assigned gateway node 10-1 but cannot accept frames forwarded by the gateway node 10-2.

Then, each non-gateway node in the mesh network may accept one copy of the flooding frame, and no duplicate of the flooding frame occurs. Therefore, flooding frame copies in multiple gateway node mesh network is decreased.

For another example, all non-gateway nodes in the mesh network may be assigned to two gateway nodes according to a round robin schema.

For another example, all non-gateway nodes in the mesh network may be assigned to two gateway nodes based on the distance between each non-gateway node and two gateway nodes. For example, a non-gateway node may be assigned to the gateway node that is closest to the non-gateway node. The distance between non-gateway nodes and two gateway nodes may be calculated in a variety of ways. For example, the distance between the non-gateway node and the two gateway nodes may be obtained by calculating the strength of the signal received by the non-gateway node from the two gateway nodes. Therefore, the distance between each non-gateway node and two gateway nodes can be predetermined.

For another example, all non-gateway nodes in the mesh network may be assigned to two gateway nodes based on the traffic load of two gateway nodes.

When the assignment is based on the traffic load of each gateway node, all non-gateway nodes may be dynamically assigned to two gateway nodes. For instance, at one point of time, when the gateway node 10-1 has a low traffic load, the non-gateway nodes 20-1 to 20-5 may be assigned to the gateway node 10-1; and at a future point of time, when the gateway node 10-1 has a high traffic load, the non-gateway nodes 20-1 to 20-5 may be assigned to gateway node 10-2.

Figure 4:
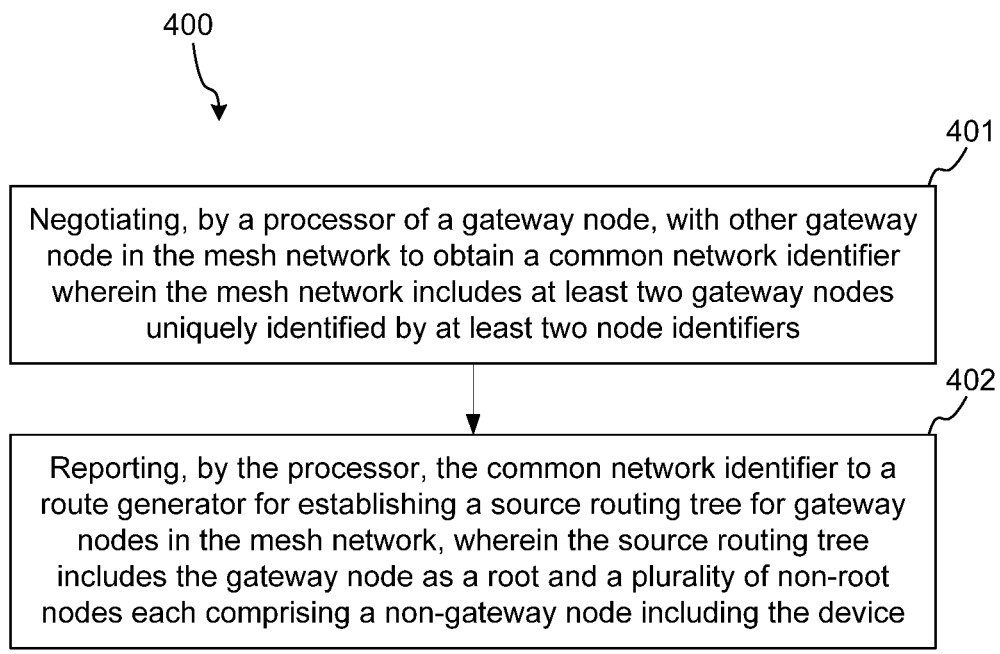
FIG. 4 is a flow chart illustrating an example method for establishing a source routing tree for gateway node in a mesh network according to present disclosure.

FIG. 4 is a flow chart illustrating an example method for establishing a source routing tree for gateway node in a mesh network according to present disclosure.

Referring to FIG. 4: A method 400 comprises: negotiating, by a processor of a gateway node, with other gateway node in the mesh network to obtain a common network identifier wherein the mesh network includes at least two gateway nodes uniquely identified by at least two node identifiers, at 401. In an example, a mesh network may include N (N≥2) gateway nodes and M (M≥2) non-gateway nodes. N gateway nodes negotiate with each other and obtain a common network identifier.

The method 400 further comprises reporting, by the processor, the common network identifier to a route generator for establishing a source routing tree for gateway nodes in the mesh network, wherein the source routing tree includes the gateway node as a root and a plurality of non-root nodes each comprising a non-gateway node including the device, at 402. In one example, the source routing tree may correspond to a source routing tree identifier that is based on a combination of the common network identifier and a node identifier of the gateway node. In one example, non-gateway nodes belonging to the source routing tree may accept a first plurality of frames forwarded by the gateway node corresponding to the source routing tree identifier. In one example, the accepted first plurality of frames may be transmitted to other nodes on non-mesh links. In one example, non-gateway nodes belonging to the source routing tree may transmit a second plurality of frames forwarded by a second and different gateway node corresponding to a second and different source routing tree identifier on mesh links in the mesh network. In an example, all non-gateway nodes in the mesh network may be assigned to gateway nodes according to a round robin schema. In another example, all non-gateway nodes in the mesh network may be assigned to gateway nodes based on the distance between each non-gateway node and gateway nodes. In another example, all non-gateway nodes in the mesh network may be assigned to gateway nodes based on the traffic load of each gateway node.

Figure 5:
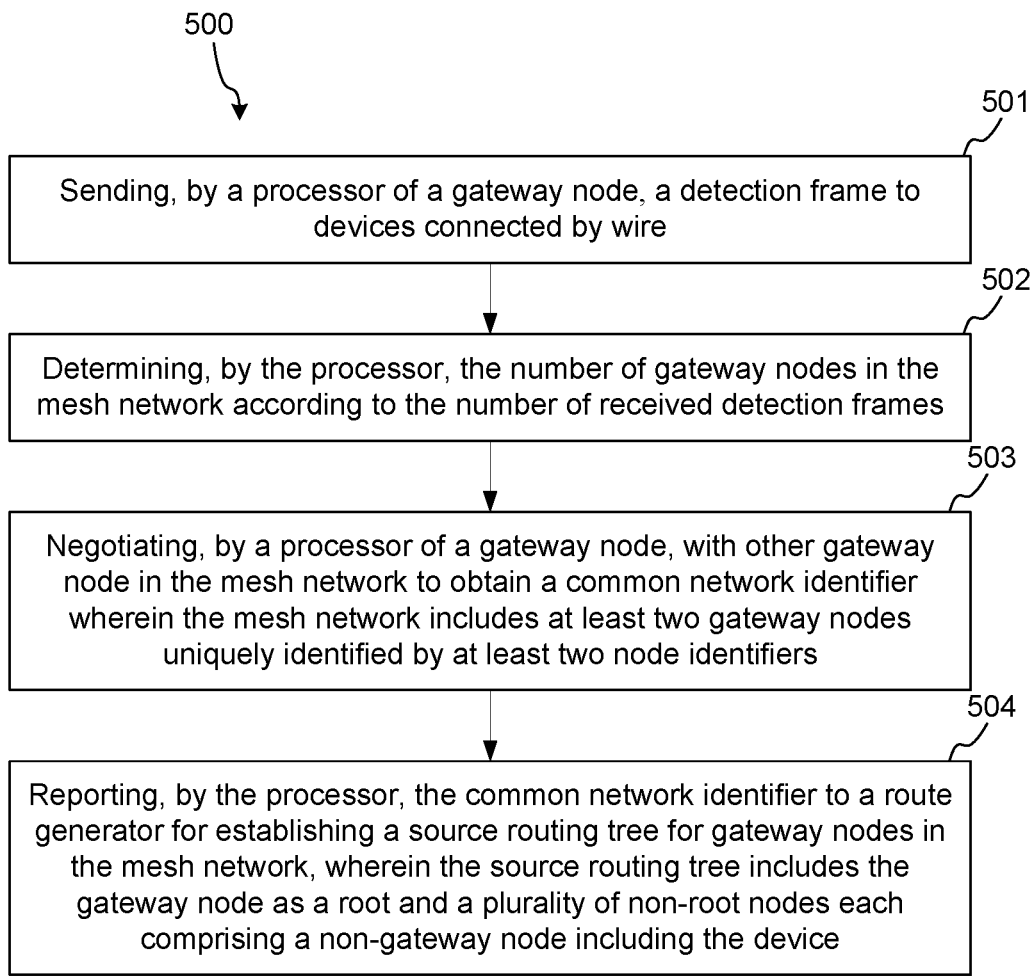
FIG. 5 is a flow chart illustrating an example method for establishing a source routing tree for gateway node in a mesh network according to present disclosure.

FIG. 5 is a flow chart illustrating an example method for establishing a source routing tree for gateway node in a mesh network according to present disclosure.

Referring to FIG. 5: A method 500 comprises: sending, by a processor of a gateway node, a detection frame to devices connected by wire, at 501.

The method 500 further comprises determining, by the processor, the number of gateway nodes in the mesh network according to the number of received detection frames, at 502.

The method 500 further comprises negotiating, by the processor, with other gateway node in the mesh network to obtain a common network identifier wherein the mesh network includes at least two gateway nodes uniquely identified by at least two node identifiers, at 503. In an example, a mesh network may include N (N≥2) gateway nodes and M (M≥2) non-gateway nodes. N gateway nodes negotiate with each other and obtain a common network identifier.

The method 500 also comprises reporting, by the processor, the common network identifier to a route generator for establishing a source routing tree for gateway nodes in the mesh network, wherein the source routing tree includes the gateway node as a root and a plurality of non-root nodes each comprising a non-gateway node including the device, at 504. In an example, all non-gateway nodes in the mesh network may be assigned to gateway nodes according to a round robin schema. In another example, all non-gateway nodes in the mesh network may be assigned to gateway nodes based on the distance between each non-gateway node and gateway nodes. In another example, all non-gateway nodes in the mesh network may be assigned to gateway nodes based on the load of each gateway node.

Figure 6:
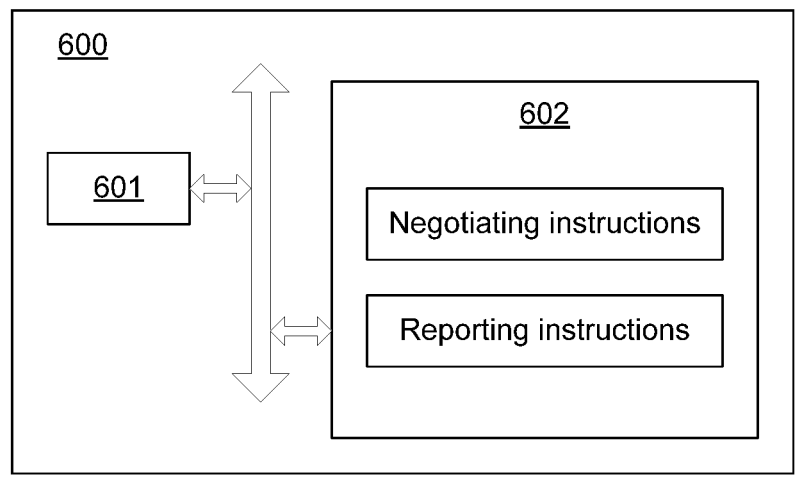
FIG. 6 is a block diagram illustrating example components for implementing the device shown in FIG. 1 according to present disclosure.

FIG. 6 is a block diagram illustrating example components for implementing the device shown in FIG. 1 according to present disclosure. The device 600 includes a processor 601 and and/or a non-transitory computer readable storage medium 602.

The non-transitory computer readable storage medium 602 stores instructions executable for the possessor 601.

The instructions include negotiating instructions that, when executed by the processor 601, cause the processor 601 to negotiate with other gateway node in the mesh network to obtain a common network identifier wherein the mesh network includes at least two gateway nodes uniquely identified by at least two node identifiers.

The instructions include reporting instructions that, when executed by the processor 601, cause the processor 601 to report the common network identifier to a route generator for establishing a source routing tree for gateway nodes in the mesh network, wherein the source routing tree includes the gateway node as a root and a plurality of non-root nodes each comprising a non-gateway node including the device.

Figure 7:
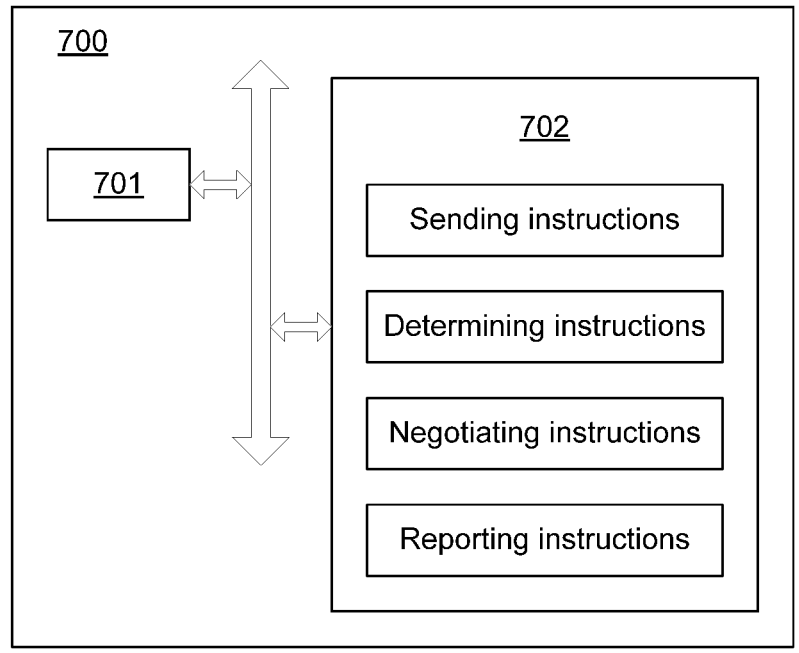
FIG. 7 is a block diagram illustrating example components for implementing the device shown in FIG. 1 according to present disclosure.

FIG. 7 is a block diagram illustrating example components for implementing the device shown in FIG. 1 according to present disclosure. The device 700 includes a processor 701 and and/or a non-transitory computer readable storage medium 702.

The non-transitory computer readable storage medium 702 stores instructions executable for the possessor 701.

The instructions include sending instructions that, when executed by the processor 701, cause the processor 701 to send a detection frame to devices connected by wire before negotiating network identifier.

The instructions include determining instructions that, when executed by the processor 701, cause the processor 701 to determine the number of gateway nodes in the mesh network according to the number of received detection frames.

The instructions include negotiating instructions that, when executed by the processor 701, cause the processor 701 to negotiate with other gateway node in the mesh network to obtain a common network identifier wherein the mesh network includes at least two gateway nodes uniquely identified by at least two node identifiers.

The instructions include reporting instructions that, when executed by the processor 701, cause the processor 701 to report the common network identifier to a route generator for establishing a source routing tree for gateway nodes in the mesh network, wherein the source routing tree includes the gateway node as a root and a plurality of non-root nodes each comprising a non-gateway node including the device.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A device at a gateway node in a mesh network comprising a processor to:
   send a detection frame to one or more network devices in the mesh network communicatively coupled to the device;
   determine a number of gateway devices in the mesh network based on a number of received detection frames;
   negotiate with other gateway node in the mesh network to obtain a common network identifier wherein the mesh network includes at least two gateway nodes uniquely identified by at least two node identifiers; and
   report the common network identifier to a route generator for establishing a source routing tree for gateway nodes in the mesh network, wherein the source routing tree includes the gateway node as a root and a plurality of non-root nodes each comprising a non-gateway node including the device.

2. The device of claim 1, wherein the source routing tree corresponds to a source routing tree identifier that is based on a combination of the common network identifier and a node identifier of the gateway node.

3. The device of claim 2, wherein non-gateway nodes belonging to the source routing tree accept a first plurality of frames forwarded by the gateway node corresponding to the source routing tree identifier.

4. The device of claim 3, wherein the accepted first plurality of frames are transmitted to other nodes on non-mesh links.

5. The device of claim 3, wherein non-gateway nodes belonging to the source routing tree transmit a second plurality of frames forwarded by a second and different gateway node corresponding to a second and different source routing tree identifier on mesh links in the mesh network.

6. A method comprising:
sending a detection frame to one or more network devices in the mesh network communicatively coupled to the device;
determining a number of gateway devices in the mesh network based on a number of received detection frames;
negotiating, by a processor of a gateway node, with other gateway node in the mesh network to obtain a common network identifier wherein the mesh network includes at least two gateway nodes uniquely identified by at least two node identifiers; and
reporting, by the processor, the common network identifier to a route generator for establishing a source routing tree for gateway nodes in the mesh network, wherein the source routing tree includes the gateway node as a root and a plurality of non-root nodes each comprising a non-gateway node including the device.

7. The method of claim 6, wherein the source routing tree corresponds to a source routing tree identifier that is based on a combination of the common network identifier and a node identifier of the gateway node.

8. The method of claim 7, wherein non-gateway nodes belonging to the source routing tree accept a first plurality of frames forwarded by the gateway node corresponding to the source routing tree identifier.

9. The method of claim 8, wherein the accepted first plurality of frames are transmitted to other nodes on non-mesh links.

10. The method of claim 8, wherein non-gateway nodes belonging to the source routing tree transmit a second plurality of frames forwarded by a second and different gateway node corresponding to a second and different source routing tree identifier on mesh links in the mesh network.

11. A non-transitory computer readable storage medium storing instructions that, when executed by a processor of a gateway node, causes the processor to:
send a detection frame to one or more network devices in the mesh network communicatively coupled to the device;
determine a number of gateway devices in the mesh network based on a number of received detection frames;
negotiate with other gateway node in the mesh network to obtain a common network identifier wherein the mesh network includes at least two gateway nodes uniquely identified by at least two node identifiers; and
report the common network identifier to a route generator for establishing a source routing tree for gateway nodes in the mesh network, wherein the source routing tree includes the gateway node as a root and a plurality of non-root nodes each comprising a non-gateway node including the device.

12. The non-transitory computer readable storage medium of claim 11, wherein the source routing tree corresponds to a source routing tree identifier that is based on a combination of the common network identifier and a node identifier of the gateway node.

13. The non-transitory computer readable storage medium of claim 12, wherein non-gateway nodes belonging to the source routing tree accept a first plurality of frames forwarded by the gateway node corresponding to the source routing tree identifier.

14. The non-transitory computer readable storage medium of claim 13, wherein the accepted first plurality of frames are transmitted to other nodes on non-mesh links.

15. The non-transitory computer readable storage medium of claim 13, wherein non-gateway nodes belonging to the source routing tree transmit a second plurality of frames forwarded by a second and different gateway node corresponding to a second and different source routing tree identifier on mesh links in the mesh network.

16. The non-transitory transitory computer readable storage medium of claim 13, wherein non-gateway nodes are assigned to a source routing tree based at least in part on a traffic load of the source routing tree.

17. The device of claim 3, wherein non-gateway nodes are assigned to a source routing tree based at least in part on a traffic load of the source routing tree.

18. The method of claim 8, wherein non-gateway nodes are assigned to a source routing tree based at least in part on a traffic load of the source routing tree.

* * * * *